United States Patent
Koga et al.

(10) Patent No.: US 10,474,117 B2
(45) Date of Patent: Nov. 12, 2019

(54) CONTROL APPARATUS, CONTROL METHOD FOR CONTROL APPARATUS, CONTROL PROGRAM, AND STORAGE MEDIUM

(71) Applicant: OMRON Corporation, Kyoto-shi, Kyoto (JP)

(72) Inventors: Tatsuya Koga, Souraku-gun (JP); Masahiro Murai, Kusatu (JP)

(73) Assignee: OMRON Corporation, Kyoto-shi (JP)

( * ) Notice: Subject to any disclaimer, the term of this patent is extended or adjusted under 35 U.S.C. 154(b) by 75 days.

(21) Appl. No.: 15/714,090

(22) Filed: Sep. 25, 2017

(65) Prior Publication Data

US 2018/0095438 A1 Apr. 5, 2018

(30) Foreign Application Priority Data

Oct. 3, 2016 (JP) ................. 2016-195892

(51) Int. Cl.
*G05B 19/04* (2006.01)
*G05B 19/29* (2006.01)
*G05B 19/418* (2006.01)
*G05B 19/06* (2006.01)

(52) U.S. Cl.
CPC ....... *G05B 19/0415* (2013.01); *G05B 19/066* (2013.01); *G05B 19/291* (2013.01); *G05B 19/41865* (2013.01)

(58) Field of Classification Search
CPC .......... G05B 19/0415; G05B 19/41865; G05B 19/291; G05B 19/066; G05B 19/416; G05B 2219/43092; G05B 2219/43045; G05B 2219/43034
See application file for complete search history.

(56) References Cited

U.S. PATENT DOCUMENTS

| 3,952,238 A | 4/1976 | Cutler | |
| 7,440,437 B2 * | 10/2008 | Song | H04L 5/006 370/208 |
| 2002/0021753 A1 * | 2/2002 | Igi | H04N 19/172 375/240.01 |
| 2002/0044554 A1 * | 4/2002 | Tanaka | H04L 12/5601 370/394 |

(Continued)

FOREIGN PATENT DOCUMENTS

| EP | 2733554 A1 | 5/2014 |
| JP | 2009-81922 A | 4/2009 |
| JP | 2016-58561 A | 4/2016 |

OTHER PUBLICATIONS

EESR dated Apr. 6, 2018 in a counterpart European Patent application.

*Primary Examiner* — Charles R Kasenge
(74) *Attorney, Agent, or Firm* — Metrolex IP Law Group, PLLC

(57) ABSTRACT

A control apparatus and the like may include a time allocation setting unit that sets a time allocation for steps in the total driving time, and an operation value calculation unit that calculates minimum operation values for the times set by the time allocation setting unit, and the time allocation setting unit sets the time allocation of the steps in the total driving time such that the difference between the minimum operation values of the steps falls within a predetermined range.

10 Claims, 9 Drawing Sheets

(56) References Cited

U.S. PATENT DOCUMENTS

| | | | |
|---|---|---|---|
| 2003/0022404 A1* | 1/2003 | Kawamura | G05B 19/418 438/14 |
| 2006/0127943 A1* | 6/2006 | Tanaka | H04L 12/5601 435/6.16 |
| 2006/0173665 A1* | 8/2006 | Arndt | G06F 1/324 703/14 |
| 2006/0176806 A1* | 8/2006 | Yoshihara | H04L 41/0896 370/229 |
| 2008/0131074 A1* | 6/2008 | Baba | H04N 9/8205 386/235 |
| 2009/0316716 A1* | 12/2009 | Tanaka | H04L 12/5601 370/458 |
| 2011/0224867 A1* | 9/2011 | Yoshikawa | F02D 41/2425 701/33.4 |
| 2012/0159507 A1* | 6/2012 | Kwon | G06F 9/5088 718/104 |
| 2013/0035773 A1 | 2/2013 | Wang et al. | |
| 2013/0038698 A1* | 2/2013 | Yoshida | G06K 9/6203 348/47 |
| 2013/0144562 A1* | 6/2013 | Ohmae | G01D 21/00 702/189 |
| 2014/0198220 A1* | 7/2014 | Nakamura | H04N 5/23203 348/169 |
| 2014/0267101 A1* | 9/2014 | Iwaki | G06F 3/048 345/173 |
| 2016/0068343 A1 | 3/2016 | Ishitani | |
| 2016/0217451 A1* | 7/2016 | Sakurai | G06Q 20/28 |

\* cited by examiner

FIG. 9

| MAXIMUM TORQUE | MAXIMUM POWER |
|---|---|
| 5N-10N | 20W-35W |
| 10N-15N | 35W-50W |
| . | . |
| . | . |
| . | . |

901

CONTROL APPARATUS, CONTROL METHOD FOR CONTROL APPARATUS, CONTROL PROGRAM, AND STORAGE MEDIUM

CROSS-REFERENCES TO RELATED APPLICATIONS

This application claims priority to Japanese Patent Application No. 2016-195892 filed Oct. 3, 2016, the entire contents of which are incorporated herein by reference.

FIELD

The disclosure relates to a control apparatus or the like for controlling processing including multiple operation steps, mechanical steps, work processes or operation schedules.

BACKGROUND

In control of operations of a machine or equipment, a method of using a minimum principle, a method of bang-bang control, and the like are used as methods for optimally performing the control.

Also, regarding a technique for optimally performing control, JP 2016-58561A discloses a component mounting apparatus for improving insufficient driving torque of a conveying belt. Also, JP 2009-81922A discloses a driving method for a pulse motor that increases the velocity of a pulse motor to a target velocity in a short amount of time while preventing step-loss.

JP 2016-58561A (published Apr. 21, 2016) and JP 2009-81922A (published Apr. 16, 2009) are examples of background art.

The above-described method of using the minimum principle and the method of bang-bang control are preferable if the conditions within the control segment are the same. However, if multiple steps with different conditions are included in the control segment, optimal control is not necessarily achieved. This will be described with reference to FIGS. 11 and 12. FIGS. 11 and 12 are diagrams for illustrating an example in which optimal control is not necessarily achieved with a conventional optimal control method in the case where multiple steps with different conditions are included in the control segment.

As shown in FIG. 11, a case of controlling an operation of moving reciprocally in a segment with a slope is considered. In this case, the slope is ascended during departure and the slope is descended during returning, and thus multiple steps with different conditions are included among all of the steps. With the conventional method, in order to optimally control such an operation, the driving time is designated for each step with a different condition, the optimal operation value in the driving time is derived, and the input locus for all steps is ultimately generated.

In other words, as shown in FIG. 12, processing in which, first, the driving time for step A is designated (S1201), the optimal operation value for the driving time is derived (S1202), and then, the driving time for step B is designated (S1203), the optimal operation value for the driving time is derived (S1204), . . . , is repeated for all steps, and the input locus for all steps is generated (S12XX).

When applied to the example shown in FIG. 11, the above-described processing is as follows. If 2 seconds is used as the overall driving time for the steps, there are two steps with different conditions, namely departing and returning, and therefore, first, the driving time for departing is designated as 1 second. Then, the optimal operation value for the driving time is derived. Here, for example, it is assumed that 30 Nm is the torque value. Next, the driving time for returning is designated as 1 second. Then, the optimal operation value for the driving time is derived. Here, for example, it is assumed that 20 Nm is the torque value. Since the return step is downhill, a value lower than that for departing is used.

In this case, the motor that controls all of the steps needs to be able to output a torque value of 30 Nm. However, since the optimal operation value in the returning step is 20 Nm, waste occurs in the motor. Accordingly, the optimal operation value cannot necessarily be derived in all of the steps.

One or more embodiments may been made in view of the foregoing problems, and may realize a control apparatus or the like that can perform optimal control in all steps.

SUMMARY

In order to solve the above-described problems, a control apparatus according to one or more embodiments is a control apparatus for controlling processing including a plurality of steps, including: an input reception unit configured to receive a total driving time for executing the processing; a time allocation setting unit configured to set a time allocation of the steps in the total driving time; and an operation value calculation unit configured to calculate the minimum operation values needed for the processing of the steps, for the times set by the time allocation setting unit, wherein the time allocation setting unit sets the time allocation of the steps in the total driving time such that a difference between the minimum operation values of the steps, which were calculated by the operation value calculation unit, falls within a predetermined range.

According to the above-described configuration, allocation of the processing times of the steps in the total driving time is performed such that the difference between the minimum operation values of the steps fall within a predetermined range. Accordingly, since the minimum operation values needed for the processing of the steps are constant, it is possible to set the operation values needed for the apparatus that executes all of the processing to the operation values. Accordingly, due to the operation values needed for the processing of the steps being separate, it is no longer necessary to match the operation values needed for the apparatus executing all of the processing to the steps with the highest operation values among the multiple steps, and therefore it is possible to suitably set the operation values needed for the apparatus that executes all of the processing. In other words, optimal control can be performed in all of the steps.

The control apparatus according to one or more embodiments may include an evaluation item reception unit configured to receive evaluation items to be evaluated in the steps, wherein in a step in which the evaluation item differs from the operation value, the operation value calculation unit calculates a minimum value of the evaluation item for the time set by the time allocation setting unit, and the time allocation setting unit converts the value of the evaluation item into the operation value and sets the time allocation of the steps in the total driving time such that a difference between the minimum operation values of the steps falls within a predetermined range.

According to the above-described configuration, if the evaluation items differ according to the step, the time allocation is set by converting to the operation values.

Accordingly, the difference between the operation values of the steps can be appropriately set within a predetermined range.

With the control apparatus according to one or more embodiments, the processing may be for moving a control target from an initial position to a predetermined position in the total driving time, the operation value calculation unit may calculate torque values as the minimum operation values for the times set by the time allocation setting unit, and the control apparatus may include an input locus generation unit configured to generate an input locus for moving the control target in the steps, the input locus being generated based on a torque waveform obtained by using the torque values calculated by the operation value calculation unit.

According to the above-described configuration, it is possible to control the control target by using an input locus that is generated from a torque waveform generated using the torque values calculated so as to be optimal.

With the control apparatus according to one or more embodiments, according to the steps, the input locus generation unit may use the torque waveform as the input locus or uses a velocity locus indicating a relationship between time and velocity of the control target, or a position locus indicating time and velocity of the control target as the input locus, the velocity locus and position locus being derived based on the torque waveform.

With the above-described configuration, according to the step, one of the torque waveform, the velocity locus, and the position locus can be used as the input locus.

The input locus generation unit may use a numerical value analysis method to calculate a switching timing and a maximum value of the torque, according to which the maximum value reaches its minimum, and thus generate the torque waveform.

In general, it is difficult to calculate the switching timing and the torque value according to which the maximum value of the torque reaches its minimum. According to the above-described configuration, it is possible to realize calculation of the switching timing and the torque value by using a numerical value analysis method. Note that the numerical value analysis method may be performed using a heuristic search algorithm, or may be performed using a convergent calculation such as Newton's law.

In order to solve the above-described problems, a control method for a control apparatus according to one or more embodiments is a control method for controlling processing including a plurality of steps, including: an input reception step of receiving a total driving time for executing the processing; a time allocation setting step of setting a time allocation of the steps in the total driving time; an operation value calculation step of calculating the minimum operation values needed for the processing of the steps, for the times set in the time allocation setting step; and a re-setting step of re-setting the time allocation of the steps in the total driving time such that a difference between the minimum operation values of the steps, which were calculated in the operation value calculation step, falls within a predetermined range.

Accordingly, effects similar to the above-described effects are achieved.

The control apparatus according to one or more embodiments may be realized using a computer, and in this case, a control program for a control apparatus that realizes the control apparatus on a computer by causing the computer to operate as the units (software elements) included in the control apparatus, and a computer-readable storage medium storing the control program also fall within the scope of the present invention.

According to one or more embodiments, due to the operation values needed for the processing of the steps being separate, the operation values needed for the apparatus that executes all of the processing no longer need to be matched with the steps having the highest operation values among the multiple steps, and therefore the effect of being able to appropriately set the operation values needed for the apparatus that executes all of the processing is exhibited.

BRIEF DESCRIPTION OF THE DRAWINGS

FIG. 9 is a diagram illustrating an example of a conversion table.

DETAILED DESCRIPTION

Embodiment 1

Hereinafter, embodiments will be described in detail. With a control system according to one or more embodiments, in a control apparatus (corresponds to control apparatus 1 in FIG. 2 and the like), an input locus according to which a control target (corresponds to control target 5 in FIG. 2 and the like) is moved to a target position (predetermined position, end position) at a target time (end time) is generated and input to a servo driver (corresponds to servo driver 3 in FIG. 2 and the like), a servo motor (corresponds to servo motor 4 in FIG. 2 and the like) is driven, and the control target is moved.

Also, in one or more embodiments, processing including multiple steps with different conditions is executed, and an input locus for performing all of the processing including the multiple steps is generated. Also, the generated input locus is optimal in all of the steps.

Accordingly, conventionally, the optimal operation value was not necessarily achieved in all of the steps by deriving the optimal operation value for each step, but in one or more embodiments, it is possible to set the optimal operation value in all steps.

Note that the input locus generated by the control apparatus 1 may be a torque locus, a velocity locus, or a position locus. A torque locus is a locus indicating a relationship between a provided torque value and time. Also, a velocity locus is a locus indicating a relationship between the velocity of the control target and time. Also, a position locus is a locus indicating a relationship between the position of the control target and time.

Also, in one or more embodiments, a servo driver 3 will be described as an example of an input destination for the input locus generated by the control apparatus 1, but the input destination of the input locus generated by the control apparatus 1 is not limited to being a servo driver 3.

Overview of Control System

Figure 2:
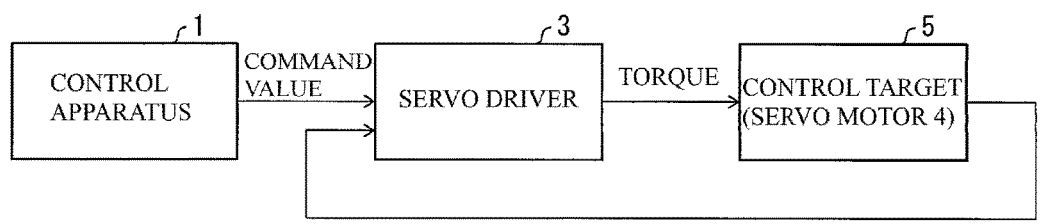
FIG. 2 is a diagram illustrating an overview of a control system according to one or more embodiments.
Figure 3:
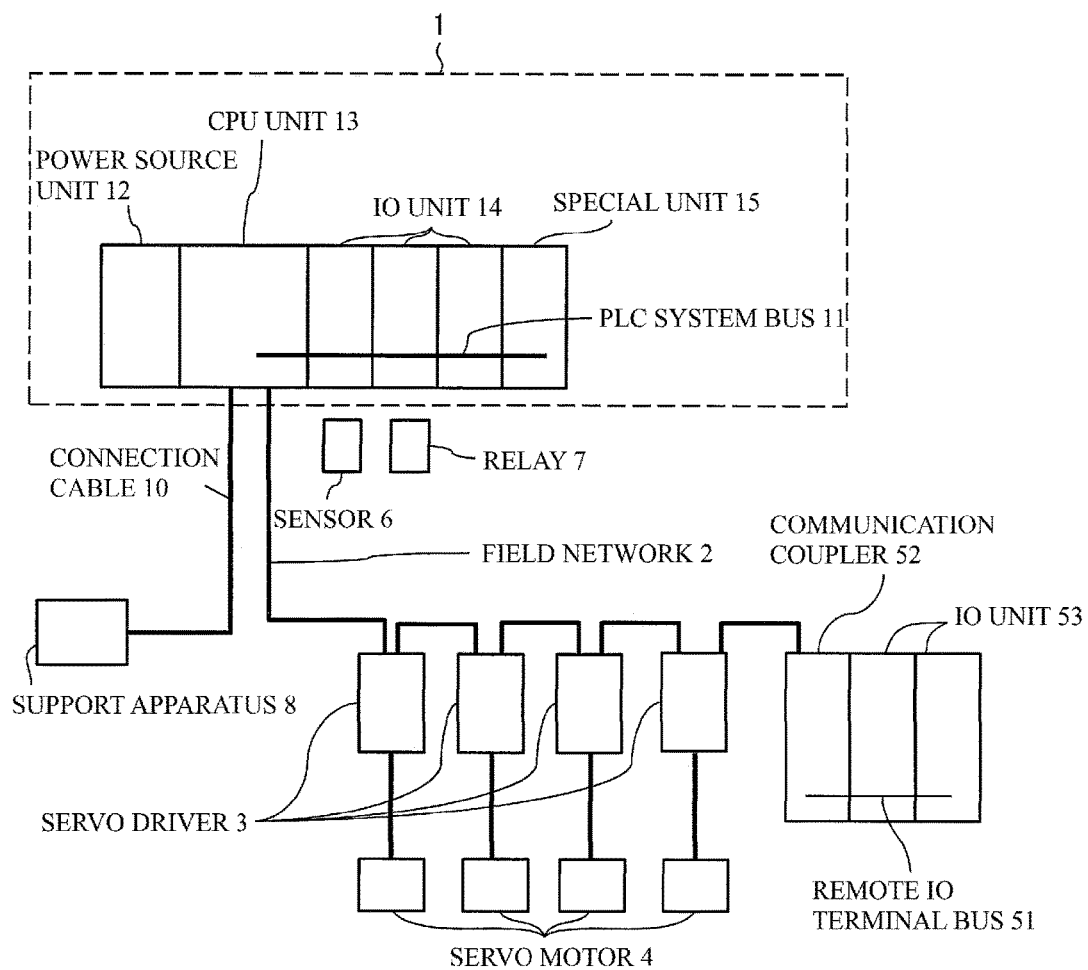
FIG. 3 is a diagram illustrating details of a control system.

First, an overview of the control system will be described with reference to FIGS. 2 and 3. FIG. 2 is a diagram showing an overview of the control system. Also, FIG. 3 is a diagram showing details of the control system.

As shown in FIG. 2, the control system includes a control apparatus (locus generation apparatus) 1, a servo driver 3, and a control target 5 (servo motor 4). Also, a command value generated by the control apparatus 1 (torque locus, velocity locus, or position locus) is input to the servo driver 3. The servo driver 3 moves the control target 5 by driving the servo motor 4 using torque based on the received command value.

The control apparatus 1 sets the command value for controlling a control target such as a machine or equipment, and includes a CPU unit 13 (FIG. 3) as a constituent element. The CPU unit 13 includes a microprocessor, a storage means including a main memory of a microprocessor, and a communication circuit. The CPU unit 13 is configured to control the control target by repeating the transmission of the output data, the reception of the input data, and execution of the control program for generating the output data using the input data.

The storage means is used to store control programs and system programs for controlling the execution of the control programs and the input and output of input data and output data. The microprocessor executes system programs and control programs stored in the storage means.

The communication circuit transmits the output data and receives the input data. As communication circuits, the control apparatus 1 includes a first communication circuit that performs transmission of the output data and reception of the input data through a control apparatus system bus, and a second communication circuit that performs transmission of output data and reception of input data through a field network 2 (FIG. 3).

More detailed description will be given with reference to FIG. 3. As shown in FIG. 3, the control apparatus system includes a control apparatus 1, the servo driver 3 and a remote IO terminal that are connected via the control apparatus 1 and the field network 2, and a sensor 6 and a relay 7, which are field devices. Also, in the control apparatus 1, the support apparatus 8 is connected via a connection cable 10 and the like.

The control apparatus 1 includes a CPU unit 13 that executes main calculation processing, one or more IO units 14, and a special unit 15. These units are configured to be able to exchange data with each other via a PLC system bus 11. Also, a power source with a suitable voltage is supplied to the units by a power source unit 12. Note that since the units constituting the control apparatus 1 are provided by a control apparatus manufacturer, in general, the PLC system bus 11 is developed and used uniquely by the control apparatus manufacturer. In contrast to this, with the field network 2, the standard and the like are often publicly available so that products of different manufacturers can be connected.

The IO unit 14 is a unit relating to general input and output processing, and controls input and output of binarized data indicating an on state and an off state. That is, the IO unit 14 collects information about being in a state in which a sensor such as the sensor 6 has detected some target object (on) or a state in which a sensor such as the sensor 6 has not detected any target object (off). Also, the IO unit 14 outputs one of a command (on) for activation and a command (off) for deactivation to an output destination such as a relay 7 or an actuator.

The special unit 15 has a function that is not supported by the IO unit 14, such as the input and output of analog data, temperature control, and communication by means of a specific communication scheme.

The field network 2 transmits various types of data to be exchanged with the CPU unit 13. Typically, various types of industrial Ethernet (registered trademark) can be used as the field network 2. As the industrial Ethernet, for example, EtherCAT (registered trademark), Profinet IRT, MECHATROLINK (registered trademark)-III, Powerlink, SERCOS (registered trademark)-III, CIP Motion and the like are known, and any of these may be employed. Furthermore, a field network other than industrial Ethernet may be used. For example, if motion control is not performed, DeviceNet, CompoNet/IP (registered trademark), and the like may be performed. With the control system according to one or more embodiments, a configuration in the case in which EtherCAT, which is industrial Ethernet, is typically employed as the field network 2 will be described as an example.

Note that the control apparatus 1 may have a configuration in which the CPU unit 13 is provided with the function of the IO unit 14 and the function of the servo driver 3, and thereby the CPU unit 13 controls a direct control target without the intervention of the IO unit 14, the servo driver 3, or the like, in a range that can be provided by this kind of built-in function.

The servo driver 3 is connected to the CPU unit 13 via the field network 2 and the servo motor 4 is driven in accordance with the command value from the CPU unit 13. More specifically, the servo driver 3 receives command values (input loci) such as a position command value, a velocity command value, and a torque command value with a constant period from the control apparatus 1. Also, the servo driver 3 acquires an actually-measured value relating to the operation of the servo motor 4, such as the position, velocity (typically calculated based on a difference between the current position and the prior position), and torque, from a detector such as a position sensor (rotary encoder) or a torque sensor connected to the axis of the servo motor 4. Also, the servo driver 3 sets the command value from the CPU unit 13 to a target value and performs feedback control using an actually-measured value as a feedback value. In other words, the servo motor 3 adjusts the current for driving the servo motor 4 such that the actually-measured value approaches the target value. Note that the servo driver 3 is also called a servo motor amplifier in some cases.

Note that FIG. 3 shows an example of a system in which the servo motor 4 and the servo driver 3 are combined, but another configuration, such as a system in which a pulse motor and a pulse motor driver are combined, can also be employed.

A remote IO terminal is furthermore connected to the field network 2 of the control apparatus system shown in FIG. 3.

The remote IO terminal typically performs processing related to general input and output processing, similarly to the IO unit 14. More specifically, the remote IO terminal includes a communication coupler 52 for performing processing relating to data transmission in the field network 2, and one or more IO unit 53. These units are configured to be able to exchange data with each other via the remote IO terminal bus 51.

Hardware Configuration of Support Apparatus 8

Figure 4:
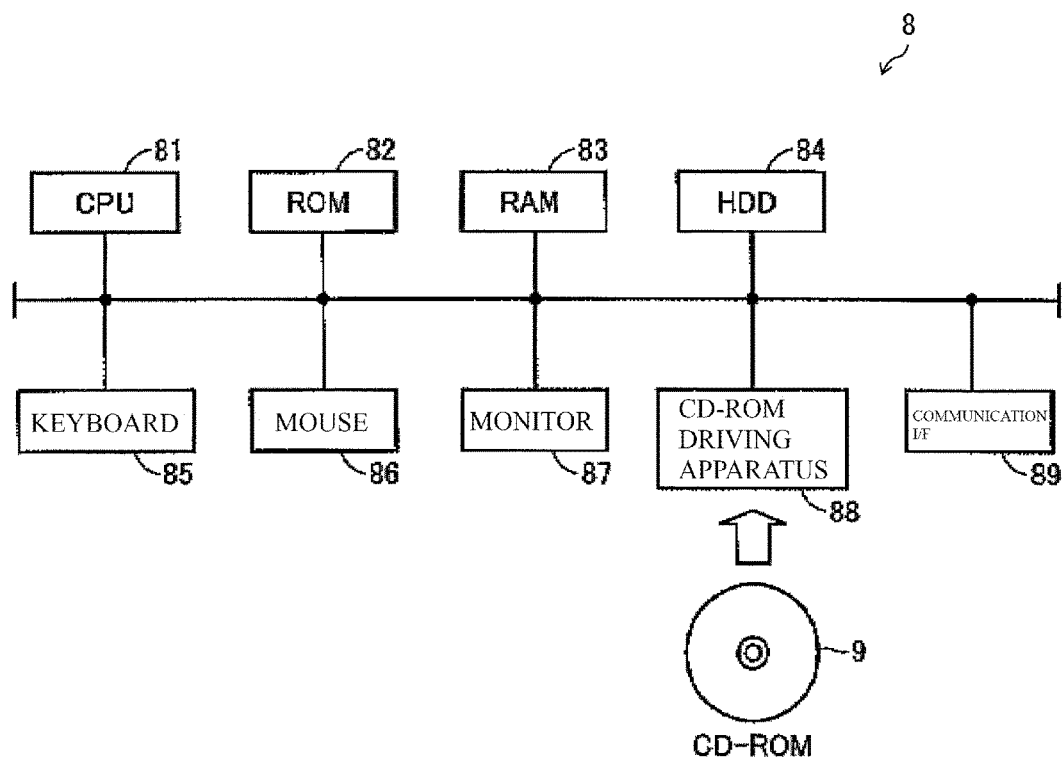
FIG. 4 is a schematic diagram illustrating a hardware configuration of a support apparatus according to one or more embodiments.

Next, a support apparatus 8 for creating a program to be executed by the control apparatus 1, performing maintenance of the control apparatus 1, and the like will be described. FIG. 4 is a schematic diagram showing a hardware configuration of a support apparatus 8. Typically, the support apparatus 8 is constituted by a general-purpose computer. Note that from the viewpoint of maintainability, the support apparatus 8 is preferably a laptop personal computer with excellent portability.

As shown in FIG. 4, the support apparatus 8 includes a CPU 81 that executes various types of programs including an OS, a ROM (Read Only Memory) 82 that stores a BIOS and various types of data, a memory RAM 83 that provides a work region for storing the data needed to execute a program on the CPU 81, and a hard disk (HDD) 84 that stores programs and the like to be executed by the CPU 81 in a non-volatile manner. The CPU 81 corresponds to a calculation unit of the support apparatus 8, and the ROM 82, the RAM 83, and the hard disk 84 correspond to the storage unit of the support apparatus 8.

The support apparatus 8 further includes a keyboard 85 and a mouse 86 that receive instructions from a user and a monitor 87 for presenting information to the user. Furthermore, the support apparatus 8 includes a communication interface (IF) 89 for communicating with a control apparatus 1 (CPU unit 13).

Various programs to be executed by the support apparatus 8 are distributed by being stored on a CD-ROM 9. The programs stored on the CD-ROM 9 are read by a CD-ROM (Compact Disk Read Only Memory) driver 88 and stored in a hard disk (HDD) 84 and the like. Alternatively, it is possible to use a configuration in which the programs are downloaded through a network from an upper-level host computer or the like.

Note that in one or more embodiments, the control apparatus 1 and the support apparatus 8 are described as separate apparatuses, but they may be constituted by the control apparatus 1 as one apparatus, and in this case, the hardware configuration of the support apparatus 8 is the hardware configuration of the control apparatus 1 as-is.

Details of Control Apparatus 1

Figure 1:
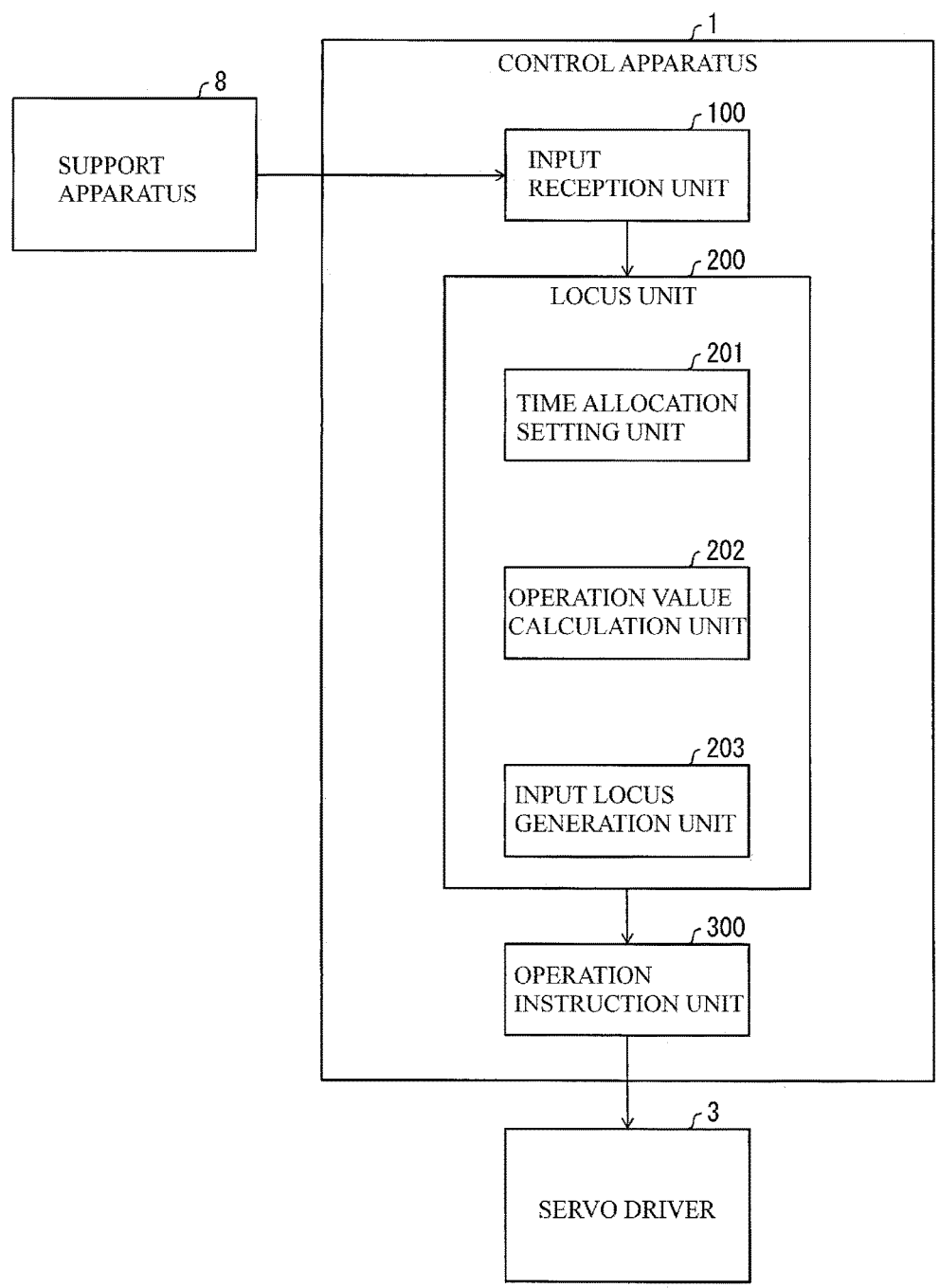
FIG. 1 is a block diagram illustrating a configuration of relevant portions of a control apparatus according to one or more embodiments.

Next, details of the control apparatus 1 will be described with reference to FIG. 1. FIG. 1 is a block diagram showing a configuration of relevant portions of the control apparatus 1.

As shown in FIG. 1, the control apparatus 1 includes an input reception unit 100, a locus unit 200, and an operation instruction unit 300. Also, the locus unit 200 includes a time allocation setting unit 201, an operation value calculation unit 202, and an input locus generation unit 203.

The input reception unit 100 receives an instruction from a user via the support apparatus 8 and notifies the locus unit 200. The content of the received instruction is "driving time", "initial position", "initial velocity", "end positions" of the steps, and "end velocities" of the steps, for example.

The locus unit 200 generates an input locus that is instructed to the servo driver 3. Specifically, the locus unit 200 generates at least one of the torque locus, the velocity locus, and the position locus as the input locus. Also, as described above, the locus unit 200 includes a time allocation setting unit 202, an operation value calculation unit 201, and an input locus generation unit 203.

The time allocation setting unit 201 sets the time allocation of the steps such that the optimal operation values in the steps of the processing match or they are within a range in which they can be said to match. It is possible to determine whether or not they are within a range in which they can be said to match based on whether or not the difference between the optimal operation values of the steps is within a predetermined range, for example. The predetermined range is a range in which the difference between the optimal operation values of the steps is 1% or less of any optimal operation value, for example. Note that 1% is merely an example, and 1% need not be used as long as the predetermined range is a range in which the optimal operation values can be said to match.

Also, the smaller the predetermined range is, the more time is needed for the processing for setting the time allocation of the steps, and therefore the predetermined range may be set by balancing the allowed processing time and the required result accuracy. For example, if the result accuracy is important and the processing time may be slightly elongated, a range in which the difference is 1.0% or less of the optimal operation value may be used as the predetermined range, and if the processing time is more important than the result accuracy, a range in which the difference is 5% or less of the optimal operation value may be used as the predetermined range.

Also, setting of the time allocation can be performed using a numerical value analysis method. The numerical value analysis method may be performed using a heuristic search algorithm (a heuristic algorithm), a genetic algorithm (GA), or particle swarm optimization (PSO), or may be performed using a convergent calculation such as Newton's law or a bisection method.

Also, if the types of optimal operation values in the steps are different, the time allocation setting unit 201 converts the optimal operation values of the different types into values to be compared and determines whether or not they match or are within a range in which they can be said to match. Note that the specific conversion method will be described later.

The operation value calculation unit 202 derives the optimal operation values of the steps. The optimal operation value is an operation value for executing the processing of the steps, and is the minimum operation value, for example. Examples of operation values include torque. The optimal operation value can be derived using a known technique, and therefore the description of the derivation method will not be included here.

The input locus generation unit 203 generates the input locus based on the time allocation set by the time allocation setting unit 201 and the operation value derived by the operation value calculation unit 202. As described above, the input locus may be a torque locus (torque waveform), a velocity locus, or a position locus. Also, in each step, the type of the input locus may be different. In other words, if there are three steps, namely step A, step B, and step C, the types of the input loci may differ in each step such that the input locus of step A is a torque locus, the input locus of step B is a velocity locus, and the input locus of step C is a position locus.

Also, the input locus generation unit 203 generates a torque locus with a torque maximum value that is at its minimum by adjusting the switching timing and the torque maximum value under the conditions that: the torque locus is a rectangular wave, the absolute values of the torque maximum value and minimum value are equal, and the switching between the maximum value and the minimum value occurs once. Adjustment of the switching timing and the maximum value of the torque can be performed using a numerical value analysis method. The numerical value analysis method may be performed using a heuristic search algorithm (a heuristic algorithm) or using a convergent calculation such as Newton's law.

Note that the input locus generation unit 203 may use the generated torque locus as the input locus, or may use at least one of the velocity locus and the position locus generated based on the torque locus as the input locus.

The operation instruction unit 300 transmits a command to the servo driver 3 in accordance with the input locus generated by the locus unit 200.

Flow of Processing in Control Apparatus 1

Figure 5:
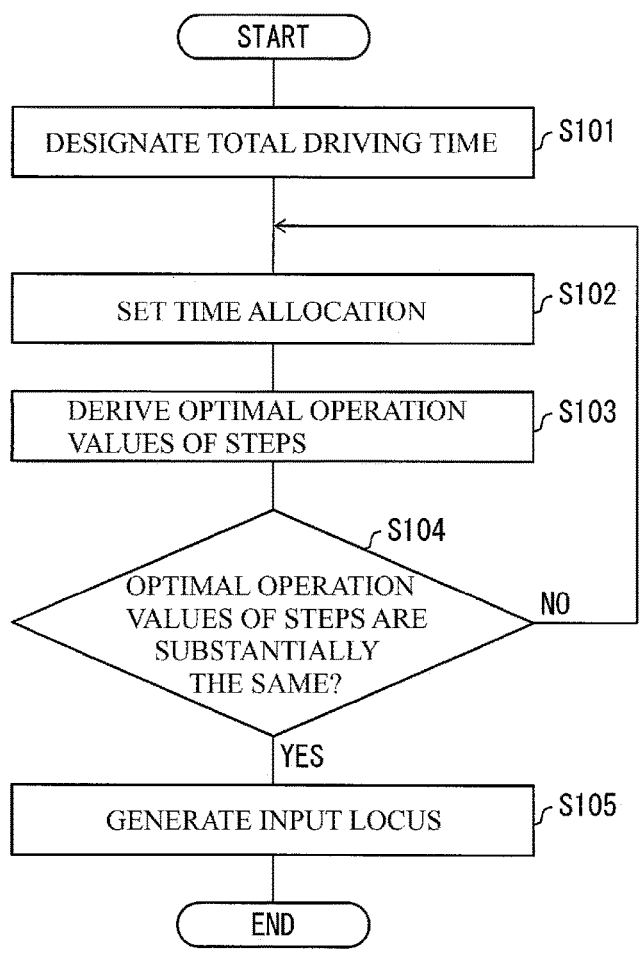
FIG. 5 is a flowchart diagram illustrating a flow of processing for generating an input locus in a control apparatus.

Next, a flow of processing for generating an input locus in the control apparatus 1 will be described with reference to FIG. 5. FIG. 5 is a flowchart diagram showing a flow of processing for generating an input locus in the control apparatus 1.

As shown in FIG. 5, with the control apparatus 1, first, designation of the total driving time is received by the input reception unit 100 (S101, input reception step). Note that with the input reception unit 100, the driving time, the initial position, the initial velocity, the end positions in the steps, and the end velocities in the steps are also received.

Next, the time allocation setting unit 201 sets the allocation of the processing times of the steps (S102, time allocation setting step, re-setting step). Next, the operation value calculation unit derives the optimal operation values in the steps for the time allocation set in step S102 (S103, operation value calculation step). In step S103, the optimal operation values for the steps are derived. In other words, if there are two steps, the respective optimal operation values for the two steps are derived, and if there are three steps, the respective optimal operation values for the three steps are derived. The same applies also in the case of four or more steps.

Then, the input locus generation unit 203 determines whether or not it can be said that the optimal operation values of the steps, which were derived in step S103, are substantially the same, or in other words, whether or not the optimal operation values of the steps match, or whether or not they fall within a range in which they can be said to match (S104). It is possible to determine whether or not the optimal operation values of the steps fall within a range in which they can be said to match based on whether or not the difference between the optimal operation values of the steps fall within a predetermined range.

If it cannot be said that the optimal operation values of the steps are substantially the same (if the optimal operation values do not match, or if they are not within a range in which they can be said to match) (NO in S104), the processing returns to step S102 and steps S102 to S104 are repeated. In other words, the time allocation is re-set in step S102, the optimal operation values are once again derived based on the re-set time allocation in step S103, and the derived optimal operation values are once again compared in step S104.

On the other hand, if it can be said that the optimal operation values of the steps are substantially the same (if the optimal operation values match or if they are within a range in which they can be said to match) (YES in S104), the input locus generation unit 203 generates the input locus based on the time allocation and the optimal operation values at that time (S105).

The foregoing description was of a flow of processing for generating an input locus in the control apparatus 1. As described above, in one or more embodiments, the setting of the time allocation of the steps and the derivation of the optimal operation values are performed using a heuristic search algorithm in which steps S102 to 104 are repeated until the optimal operation values of the steps match, or until they fall within a range in which they can be said to match.

Effect Achieved by One or more Embodiments

Figure 6A:
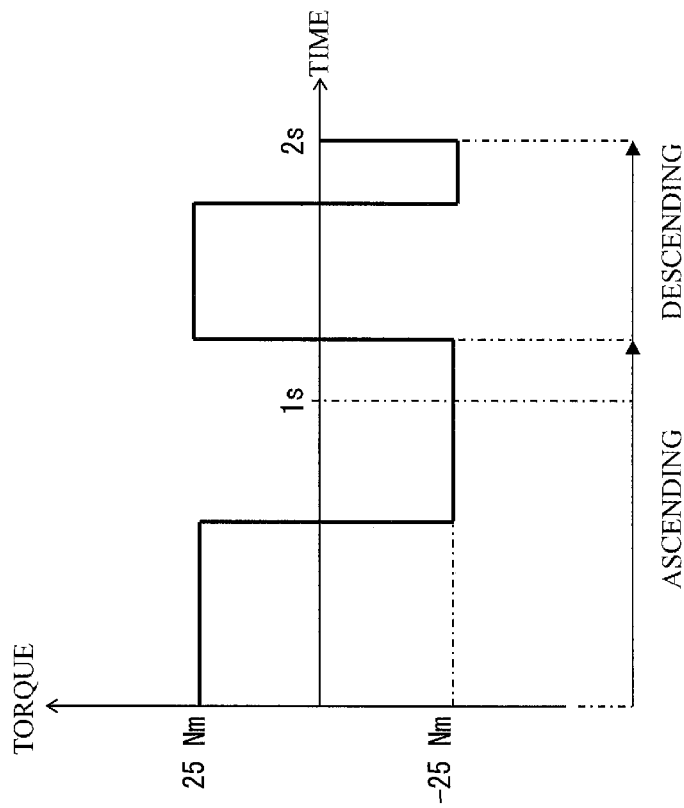
FIGS. 6A and 6B are diagrams illustrating an effect obtained according to one or more embodiments.
Figure 6B:
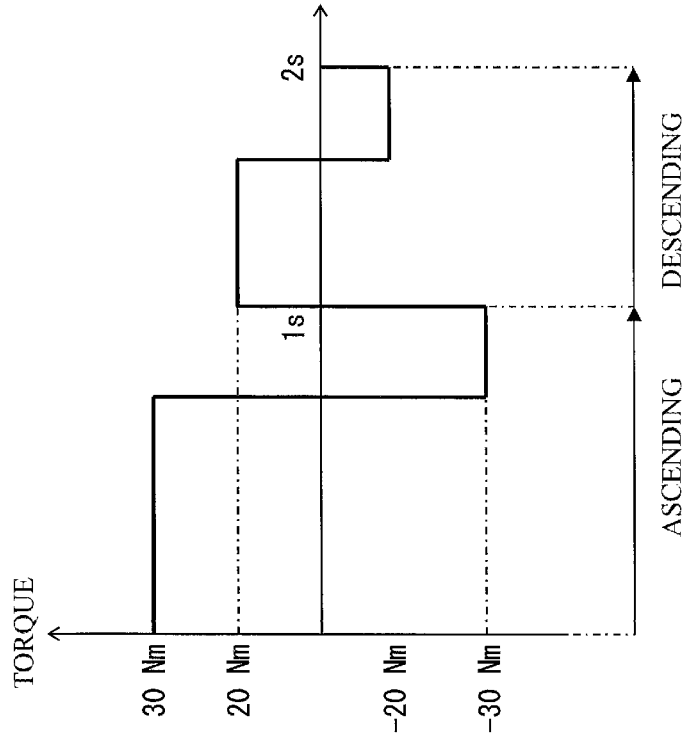
Figure 11:
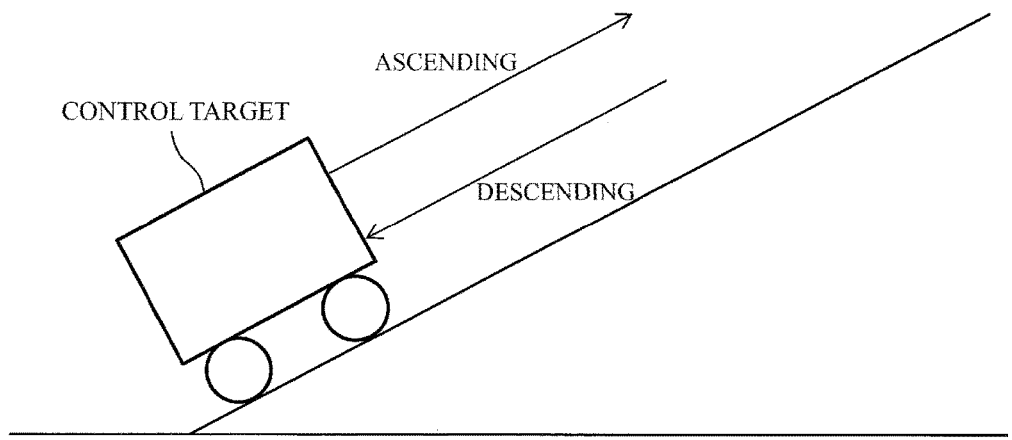
FIG. 11 is a diagram illustrating a problem with a conventional technique.
Figure 12:
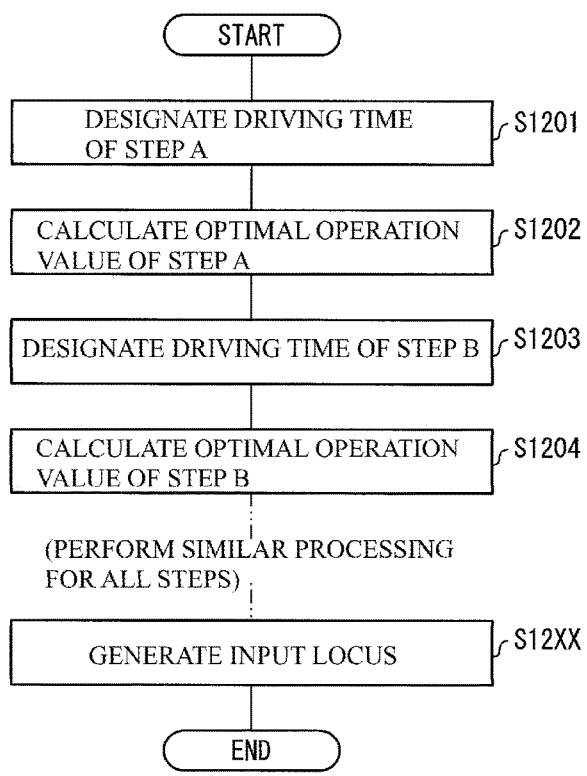
FIG. 12 is a flowchart diagram illustrating a flow of optimal control in the conventional technique.

The effect achieved by one or more embodiments will be described with reference to FIGS. 6A and 6B. FIGS. 6A and 6B are diagrams showing an effect obtained by one or more embodiments. Note that here, the case of the example shown in FIG. 11 will be described. In other words, all of the steps are composed of two steps, that is, a step of ascending a slope and a step of descending a slope, and the total driving time is 2 seconds. FIG. 6A shows a torque locus obtained through the conventional optimal control. As shown in FIG. 6A, in the conventional optimal control, the driving times of the ascending step and the descending step are each 1 second, the optimal operation value in the ascending step is 30 Nm, and the optimal operation value in the descending step is 20 Nm. Accordingly, as described above, in the conventional optimal control, a motor that can output a torque value of at least 30 Nm is needed.

FIG. 6B shows a torque locus generated according to one or more embodiments. As shown in FIG. 6B, with the torque locus generated according to one or more embodiments, the driving time of the ascending step is 1.2 seconds, the driving time of the descending step is 0.8 seconds, and the optimal driving values in the ascending step and the descending step match at 25 Nm.

Accordingly, in one or more embodiments, the torque value needed in all steps is 25 Nm, and it is sufficient to use a motor that can output a torque value of at least 25 Nm. Accordingly, the capacity of the motor can be reduced compared the conventional technique. Also, if a motor with the same capacity as in the conventional technique is used, the weight of the control target can be increased, and if the same weight is used, the driving time can be shortened.

Embodiment 2

Figure 7:
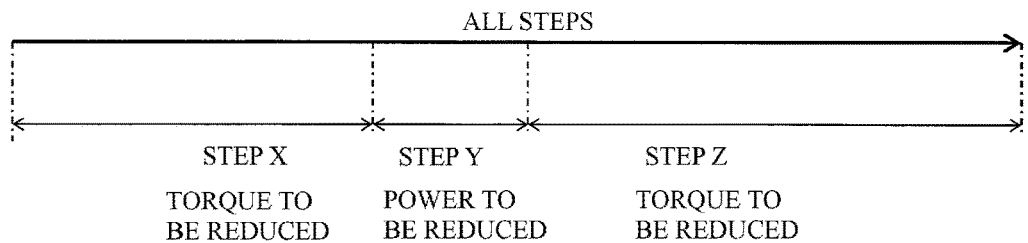
FIG. 7 is a diagram illustrating an example in which evaluation items are different in the multiple steps.

Other embodiments are described as below with reference to FIGS. 7 to 9. Note that for the sake of convenience, members having the same function as members described in the above-described embodiments are denoted by the same reference numerals and description thereof is not included here.

Overview

In Embodiment 1, the time allocation of the steps was set such that the optimal operation values match. However, depending on the user, the types of the operation values to be set to the minimum in the steps differ in some cases. For example, as shown in FIG. 7, steps X, Y, and Z are present, and if the torque is to be reduced in steps X and Z and the power is to be reduced in step Y, the types of the optimal operation values that are to be matched will not match as they are, and simply cannot be compared.

In view of this, in one or more embodiments, an evaluation item reception unit that receives the type of the operation value (evaluation item) that the user wants to set as an evaluation target is included, and after deriving the optimal operation value for the evaluation item, the derived optimal operation value is converted into an operation evaluation value (conversion evaluation value) for comparing the operation values of the steps, and the time allocation of the steps is set such that the operation evaluation values match. Accordingly, even if the types of the operation values to be adjusted according to the steps are different, it is possible to suitably derive the optimal operation values.

Flow of Processing

Next, a flow of processing in a case where the types of operation values to be set to the minimum in the steps are different will be described with reference to FIG. 8. FIG. 8 is a flowchart diagram showing a flow of processing in a case of having different types of operation values that are to be set to the minimum in the steps. Note that hereinafter, it is assumed that a conversion table for converting the optimal operation values to the operation evaluation values in advance is held. Also, the evaluation items of the steps are instructed by the user.

Figure 8:
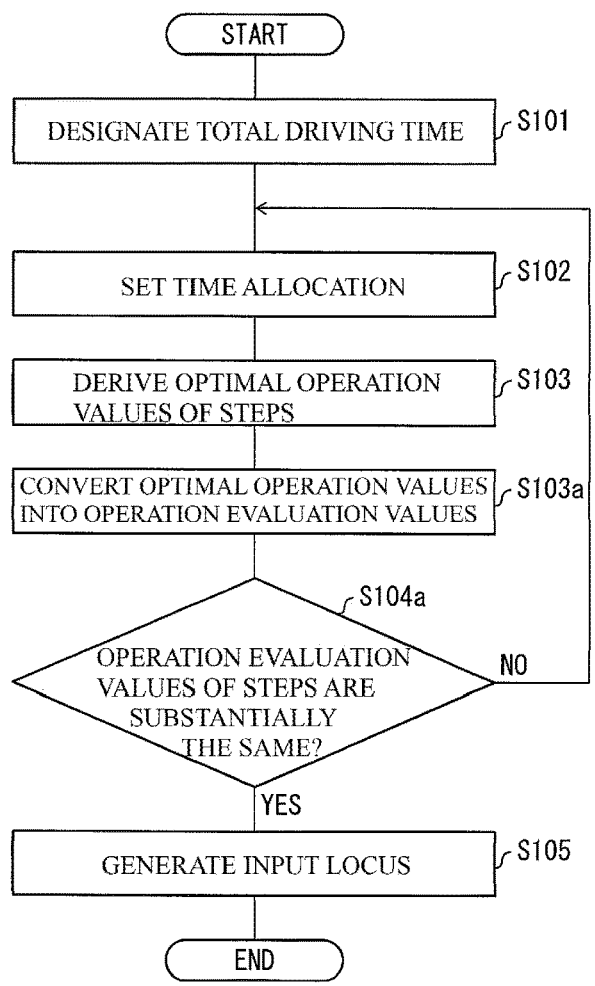
FIG. 8 is a flowchart diagram illustrating a flow of processing in a case of having different types of operation values that are to be set to the minimum in the steps.

As shown in FIG. 8, the processing is similar to that shown in FIG. 5 in Embodiment 1 until step S103. Note that in step S103, the optimal operation values for the evaluation items instructed by the user are derived for the steps.

In one or more embodiments, after step S103, the derived optimal operation values are converted into the operation evaluation values (S103a). The derivation of the operation evaluation values can be performed using a table, for example. FIG. 9 shows an example of a table. FIG. 9 shows a table showing a correspondence between the torque and the power. In the table 901 shown in FIG. 9, the torque "5N to 10N" corresponds to the power "20 W to 35 W", and the torque "10N to 15N" corresponds to the power "35 W to 50 W". Accordingly, if the operation evaluation value is the torque, the corresponding torque can be derived based on the power. Note that if the types of the optimal operation values derived in step S103 are the same as the types of the operation evaluation values, the processing of step S103a is not needed.

Then, the input locus generation unit 203 determines whether or not the operation evaluation values derived in step S103a can be said to be substantially the same, or in other words, whether or not the operation evaluation values of the steps match or whether or not they are within a range in which they can be said to match (S104a). It is possible to determine whether or not the operation evaluation values of the steps fall within a range in which they can be said to match based on whether or not the difference between the operation evaluation values of the steps falls within a predetermined range.

If the operation evaluation values of the steps cannot be said to be substantially the same (if the operation evaluation values do not match or if they are not within a range in which they can be said to match) (NO in S104a), the processing returns to step S102 and steps S102 to S104a are repeated.

On the other hand, if it can be said that the operation evaluation values of the steps are substantially the same (if the operation evaluation values match, or if they are within a range in which they can be said to match) (YES in S104a), the input locus generation unit 203 generates the input locus based on the time allocation and the optimal operation values at that time (S105).

Accordingly, even if the types of the operation values to be reduced are different according to the steps, the time allocation can be set appropriately and the optimal operation values can be derived.

Note that in the above description, the power was given as a type of operation value to be reduced, but other than the power, it is also possible to use a vibration amount, a maximum acceleration, a maximum speed, jerk, the maximum value of the sum of the velocity and the acceleration, and the like.

Example of Functional Block

Figure 10:
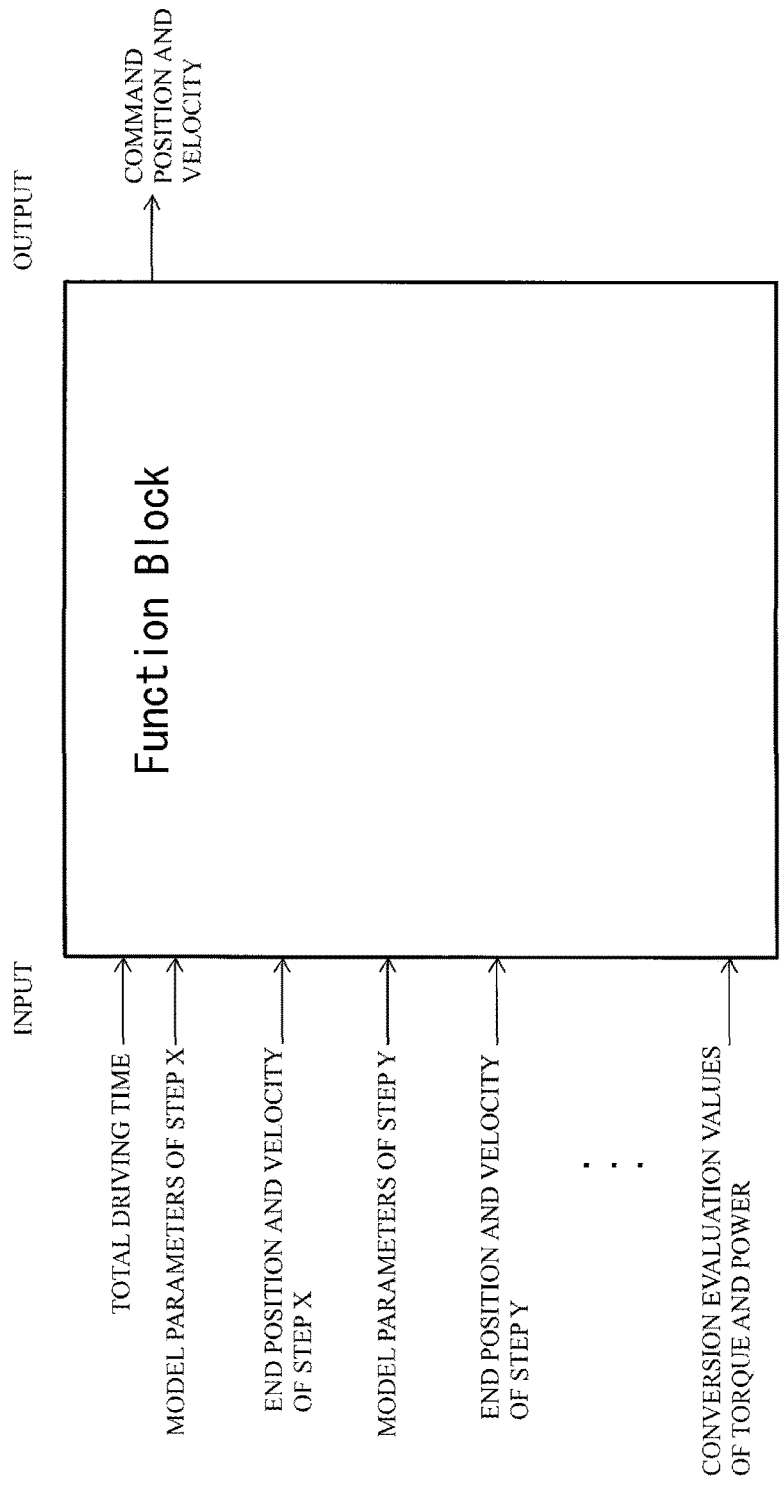
FIG. 10 is a diagram illustrating an example of a functional block according to one or more embodiments.

Another example in which the control apparatus 1 according to one or more embodiments is indicated as a functional block will be described with reference to FIG. 10. FIG. 10 is a diagram showing an example in which the control apparatus 1 is indicated as a functional block.

In the functional block shown in FIG. 10, input data is shown on the left side and output data is shown on the right side. As shown in FIG. 10, with one or more embodiments, the total driving time, the model parameters of step X, the end position of step X, the end velocity, the model parameters of step Y, the end position of step Y, the end velocity, and the conversion evaluation value of the torque and the power are input as the input data. Also, the command position and command velocity are output as the output data in response to these inputs.

Note that the example of the functional block in FIG. 10 is merely an example, and the steps X, Y, . . . differ according to the number of processing steps to be controlled. Also, the conversion evaluation values for the torque and the power are not essential, and if the types of the operation values to be compared are the same, the conversion evaluation values are not needed.

Example Realized Using Software

The control blocks of the control apparatus 1 (in particular, the locus unit 200 (time allocation setting unit 201, operation value calculation unit 202), input locus generation unit 203), and the operation instruction unit 300) may be realized through a logic circuit (hardware) formed in an integrated circuit (IC chip), or may be realized through software using a CPU (Central Processing Unit).

In the latter case, the control apparatus 1 includes a CPU that executes commands for a program, which is software that executes functions, a ROM (Read Only Memory) or a storage apparatus (these are called "storage media") that stores the above-described program and various types of data in a manner of being readable by a computer (or a CPU), a RAM (Random Access Memory) for expanding the above-described program, and the like. Also, the computer (or CPU) reads the above-described program from the above-described storage medium and executes it. As the above-described storage medium, a "non-temporary tangible medium" such as a tape, a disk, a card, a semiconductor memory, or a programmable logic circuit can be used. Also, the above-described program may be supplied to the above-described computer via any transmission medium (a communication network, a broadcasting wave, or the like) that can transmit the program. Note that one or more embodiments can also be realized in the form of a data signal embedded in a broadcasting wave in which the above-described program is realized through electronic transmission.

The present invention is not limited to the above-described embodiments and can be modified in various ways within the scope indicated in the claims, and the technical scope of the present invention encompasses embodiments obtained by combining technical means disclosed in different embodiments.

The invention claimed is:

1. A control apparatus for controlling processing comprising a plurality of operation steps, the control apparatus comprising a processor configured with a program to perform operations comprising:

operation as an input reception unit configured to receive a total driving time for executing the processing;

operation as a time allocation setting unit configured to set a time allocation for each of the plurality of the operation steps comprising a portion of the total driving time during which the corresponding operation step is to be executed;

operation as an operation value calculation unit configured to calculate torque values as minimum operation values needed to execute each of the plurality of the operation steps within the corresponding time allocation; and operation as an input locus generation unit configured to generate an input locus for moving a control target in the plurality of operation steps, the input locus being generated based on a torque waveform obtained by using the torque values, wherein the plurality of operation steps comprising moving the control target from an initial position to a predetermined position, the processor is configured to perform operations such that operation as the time allocation setting unit comprises operation as the time allocation setting unit configured to set the time allocation for each of the plurality of the operation steps such that a difference between the minimum operation values needed to execute each of the plurality of the operation steps within the corresponding time allocation falls within a predetermined range, and the processor is configured with the program to perform operations such that operation as the operation value calculation unit comprises operation as the operation value calculation unit that calculates torque values as the minimum operation values needed to execute each of the plurality of the operation steps within the corresponding time allocation.

2. The control apparatus according to claim 1, wherein the processor is configured with the program to perform operations comprising operation as an evaluation item reception unit configured to receive evaluation items to be evaluated in the plurality of the operation steps, wherein
the processor is configured with the program to perform operations such that, in response to the evaluation item differing from the operation value:
the operation value calculation unit calculates a minimum value of the evaluation item for the time allocation; and
the time allocation setting unit converts the value of the evaluation item into the operation value and sets the time allocation of each of the plurality of the operation steps such that the difference between the minimum operation values needed to execute each of the plurality of the operation steps within the corresponding time allocation falls within the predetermined range.

3. The control apparatus according to claim 1, wherein
the processor is configured with the program such that operation as the input locus generation unit comprises operation as the input locus generation unit that uses, as the input locus: the torque waveform, a velocity locus indicating a relationship between time and a velocity of the control target; or a position locus indicating time and the velocity of the control target, the velocity locus and position locus being derived based on the torque waveform.

4. The control apparatus according to claim 3, wherein
the processor is configured with the program such that operation as the input locus generation unit comprises operation as the input locus generation unit that uses a numerical value analysis method to calculate a switching timing and a maximum value of the torque value, according to which the maximum value reaches its minimum, and thus generates the torque waveform.

5. The control apparatus according to claim 1, wherein
the processor is configured with the program such that operation as the input locus generation unit comprises operation as the input locus generation unit that uses a numerical value analysis method to calculate a switching timing and a maximum value of the torque value, according to which the maximum value reaches its minimum, and thus generates the torque waveform.

6. A non-transitory computer-readable storage medium storing a control program for causing a computer to function as the control apparatus according to claim 1.

7. A control method for controlling processing comprising a plurality of operation steps, the control method comprising:
receiving a total driving time for executing the processing;
setting a time allocation for each of the plurality of the operation steps comprising a portion of the total driving time during which the corresponding operation step is to be executed;
calculating minimum operation values comprising torque values needed to execute each of the plurality of the operation steps within the corresponding time allocation;
re-setting the time allocation of each of the plurality of operation steps such that a difference between the minimum operation values needed to execute each of the plurality of the operation steps within the corresponding time allocation falls within a predetermined range; and
generating an input locus for moving a control target in the plurality of the operation steps based on a torque waveform obtained by using the torque values, wherein
the plurality of operation steps comprises moving the control target from an initial position to a predetermined position.

8. The control method according to claim 7, further comprising:
receiving an evaluation item to be evaluated in the plurality of the operation steps;
calculating a minimum value of the evaluation item for the time allocation; and
converting the value of the evaluation item into the operation value and setting the time allocation of each of the plurality of the operation steps such that the difference between the minimum operation values needed to execute each of the plurality of the operation steps within the corresponding time allocation falls within the predetermined range.

9. The control method according to claim 7, wherein the input locus comprises: the torque waveform; a velocity locus indicating a relationship between time and velocity of the control target; or a position locus indicating time and the velocity of the control target, the velocity locus and the position locus being derived based on the torque waveform.

10. The control method according to claim 7, wherein the torque waveform is obtained using a numerical value analysis method to calculate a switching timing and a maximum value of the torque value, according to which the maximum value reaches its minimum.

* * * * *